(12) United States Patent
Campos Beceiro

(10) Patent No.: US 12,502,874 B2
(45) Date of Patent: Dec. 23, 2025

(54) CO-EXTRUDED MULTILAYER STRUCTURE AND METHOD FOR OBTAINING THEREOF

(71) Applicant: KLONER S.L., Barcelona (ES)

(72) Inventor: Alberto Campos Beceiro, Barcelona (ES)

(73) Assignee: KLONER S.L., Barcelona (ES)

( * ) Notice: Subject to any disclaimer, the term of this patent is extended or adjusted under 35 U.S.C. 154(b) by 0 days.

(21) Appl. No.: 18/444,037

(22) Filed: Feb. 16, 2024

(65) Prior Publication Data

US 2024/0181760 A1 Jun. 6, 2024

Related U.S. Application Data

(62) Division of application No. 17/290,898, filed as application No. PCT/EP2019/080242 on Nov. 5, 2019, now abandoned.

(30) Foreign Application Priority Data

Nov. 5, 2018 (EP) ..................................... 18382787

(51) Int. Cl.
*B29C 48/00* (2019.01)
*B29C 48/08* (2019.01)
*B29C 48/21* (2019.01)
*B29C 48/22* (2019.01)
*B29C 55/02* (2006.01)
*B32B 7/12* (2006.01)
*B32B 27/08* (2006.01)
*B32B 37/15* (2006.01)

(52) U.S. Cl.
CPC .......... *B32B 27/08* (2013.01); *B29C 48/0018* (2019.02); *B29C 48/022* (2019.02); *B29C 48/08* (2019.02); *B29C 48/21* (2019.02); *B29C 48/22* (2019.02); *B29C 55/023* (2013.01); *B32B 7/12* (2013.01); *B32B 37/153* (2013.01); *B32B 2250/02* (2013.01); *B32B 2250/24* (2013.01); *B32B 2307/7246* (2013.01); *B32B 2307/732* (2013.01); *B32B 2555/02* (2013.01)

(58) Field of Classification Search
CPC ... B29C 48/0018; B29C 48/022; B29C 48/08; B29C 48/21; B29C 55/005; B29C 55/023; B29K 2023/0633; B29K 2023/065; B29K 2023/083; B29K 2023/12; B29K 2075/00; B29K 2077/00

USPC ........... 264/173.14, 173.15, 173.16, 173.19, 264/210.1, 210.6, 331.18, 331.19

See application file for complete search history.

(56) References Cited

U.S. PATENT DOCUMENTS

| 5,114,763 | A | 5/1992 | Brant et al. |
| 2003/0113548 | A1 | 6/2003 | Corzani et al. |
| 2005/0101735 | A1* | 5/2005 | Marston ................. C08L 77/00 525/178 |
| 2008/0254281 | A1 | 10/2008 | Chen et al. |
| 2009/0054861 | A1 | 2/2009 | Watson et al. |
| 2012/0172826 | A1 | 7/2012 | Ng et al. |
| 2017/0152377 | A1 | 6/2017 | Wang et al. |

FOREIGN PATENT DOCUMENTS

| FR | 2605930 A1 * | 5/1988 | ......... B29C 48/0018 |
| JP | 2005125574 A * | 5/2005 | ........... B29C 55/023 |
| WO | 2013133956 A2 | 9/2013 | |
| WO | 2014179469 A2 | 11/2014 | |
| WO | 2015034804 A1 | 3/2015 | |
| WO | 2016177621 A1 | 11/2016 | |

OTHER PUBLICATIONS

Translation of FR 2605930 A1 (published on May 6, 1988).*
Translation of JP 2005125574 A (published on May 19, 2005).*
International Search Report and Written Opinion issued in PCT/EP2019/080242, mailed Nov. 22, 2019.
Restriction for Restriction/Election of U.S. Appl. No. 17/290,898, mailed Mar. 9, 2023.
Non Final Office Action of U.S. Appl. No. 17/290,898, mailed Jun. 29, 2023.

* cited by examiner

*Primary Examiner* — Leo B Tentoni
(74) *Attorney, Agent, or Firm* — Leason Ellis LLP

(57) ABSTRACT

The present invention is directed to a novel co-extruded multilayer structure that possess a draw down ratio superior than the critical draw-down ratio of each one of the polymeric layers, extruded individually. The present invention is also directed to a method for obtaining the co-extruded multilayer structure. The co-extruded multilayer structure obtainable by the method described herein allows preparing films, filaments or spun-melt non-wovens of low weight at high speed using conventional extrusion equipments. The co-extruded multilayer structure is especially suitable as diaper back-sheets or flexible packaging coatings.

7 Claims, 2 Drawing Sheets

2.5μm 1.5μm

CO-EXTRUDED MULTILAYER STRUCTURE AND METHOD FOR OBTAINING THEREOF

CROSS-REFERENCE TO RELATED PATENT APPLICATIONS

This application is a Divisional of application Ser. No. 17/290,898, filed May 3, 2021, which is now abandoned, U.S. National Phase Application under 35 U.S.C. § 371 of International Patent Application No. PCT/EP2019/080242, filed Nov. 5, 2019, and claims priority to European Application No. 18382787.2, filed Nov. 5, 2018, all of which are incorporated by reference in their entireties. The International Application was published on May 14, 2020 as International Publication No. WO 2020/094643 A1.

FIELD OF THE INVENTION

The present invention is in the extrusion field, particularly, in the extrusion of polymer melts.

The present invention relates to a novel co-extruded multilayer structure as well as to a method for obtaining the co-extruded multilayer structure.

The present invention further relates to the co-extruded multilayer structure for use as a coating. The coating can be a diaper back sheet or a flexible packaging coating.

BACKGROUND OF THE INVENTION

Polymer extrusion processes like film cast extrusion, extrusion-coating, blown film, profile extrusion or filament spinning are subjected to serious limitations either in speed and in down-gauging film thickness or filament diameter because of process instabilities related to extrusion speed and draw-down.

Extrusion speed limitations are related to shear flow instabilities. Critical shear stress leads to well-known drawbacks melt shark skin or stick-lip, and finally melt breakage. In shear flow condition, limitation in extrusion speed is caused by shear stress at the die gap; besides, the polymer rheology itself, the presence of lubricants and the process conditions, the shear stress depends strongly on die gap section area and melt speed at the die exit or the spinneret capillary.

Draw-down limitations are related to extensional flow instabilities. These instabilities are well-known drawbacks melt draw resonance and gross melt fracture. The extensional flow behaviour of a polymer melt depends on its extensional viscosity.

We can define draw-down ratio as the dimensionless ratio between the extruder die gap section area and the final film section area, divided by the blow up rate in case of blown film or the spinneret capillary section area and the final filament section ratio is case of filament spinning. Draw down ratio can also be defined as the ratio of the final take-off position speed to the die exit speed.

Under extensional flow, polymer melts behaviour differs dramatically from that under shear flow due to the nature of the stresses related to molecular chains interactions under deformation.

Extrusion of polymer melts is principally dominated by their extensional flow behaviour and not by their shear flow behaviour, melt instabilities in extrusion are therefore principally related to the extensional behaviour of the melt.

The extensional flow behaviour of a polymer melt depends on its extensional viscosity and the extensional viscosity $\lambda$ (also known as extension, tension, traction or stretching viscosity) is defined by the ratio of extensional stress and extensional rate: $\lambda = \sigma/(d\varepsilon/dt)$ where $\sigma$ is the extensional stress and $\varepsilon$ is the extension strain or draw down ratio defined as the ratio between length increase and initial length: $\Delta\varepsilon = \Delta l/l_0$; and for instantaneous strain: $d\varepsilon = dl/l$ In steady state flow conditions & is constant.

Due to experimental and physical limitations, it is difficult to achieve steady state conditions in extensional viscosity measurements; instead we usually have a plot of transient data showing the evolution of extensional viscosity over time for different strain rates.

Commercial extensional rheometers either based on constant or variable speed of a melt polymer are available in the art. Fixtures for extensional measurements using shear rheometers are also very common. See for example "*Polymer Melt Rheology and the Rheotens Test*" von Anka Bernnat, Institut fur Kunststofftechnologie, Universit "at Stuttgart, 2001. The Rheotens experiment is a quasi-isothermal fibre spinning experiment. A polymer melt presheared in a capillary die is stretched under the action of a constant drawdown force until rupture of the filament. The experiment results in an extension diagram which describes the elongational behaviour of a polymer melt and therefore is relevant for many polymer processes like blow moulding, film blowing, and fibre spinning. Also, the rupture stress of a polymer melt can be calculated, which is of importance for these industrial applications. In general, melt strength and drawability depend on the material properties of the melt and on the processing conditions of the experiment. The existence of Rheotens mastercurves allows to separate the polymer melt properties from the processing conditions and thus simplifies the description of elongational behaviour under constant force deformation. The Rheotens mastercurve reflects structural differences of polymer melts.

As an example to determine the extensional viscosity of a polymer see "*Determination of elongational viscosity of polymer melts by RME and Rheotens experiments*" by Manfred H. Wagner, Rheol Acta (2002) 41:316-325, DOI 10.1007/s00397-002-0228-0, which is attached herein.

Three types of pure elongational flow behaviour can be observed:

1. The extensional viscosity is independent of the elongational tensile stress, these materials are called Troutonian materials and the viscosity is often referred to as the Troutonian viscosity.
2. The extensional viscosity increases permanently with tensile stress. This behaviour is known as tension stiffening, strain thickening, extensional thickening or elongational thickening. It is the analogue to dilatancy in shear flow.
3. The extensional viscosity reaches a maximum value and then decreases with tensile stress. This behaviour is known as tension thinning, strain thinning, extensional thinning or elongational thinning. It is the analogue to pseudo plasticity or shear thinning.

Troutonian materials, that is, the extensional viscosity is more or less independent of flow rate. This includes polymethyl methacrylate (PMMA), polystyrene (PS), polyethylene terephthalate (PETE), polycarbonate (PC) and polysulfone (PES), and all the Newtonian fluids.

Extensional thickening has been observed for substantially long branched polymer structures like low density polyethylene (LDPE), high melt strength polypropylene (HMSPP), ethylene vinyl acetate (EVA).

Linear or substantially short branched polymers such as high density polyethylene (HDPE) and polypropylene (PP), exhibit extensional thinning when exposed to extensional flow Thus, depending on extensional viscosity behaviour of polymer melts, the above mentioned instability drawbacks under extensional flow are:
1. Melt draw resonance
2. Gross Melt fracture Melt Draw Resonance This phenomena has been first described by Christensen (1962) in a discussion about extrusion coating with polypropylene as surging or draw resonance then, among multitude of other works, the patent of Kurt et al. U.S. Pat. No. 4,339,507 and Luchessi et al. U.S. Pat. No. 4,486,377 describe draw resonance as sustained random or periodic oscillation, variation or pulsation of the polymer melt respect to the velocity and cross sectional area of a melt drawing process that occurs between the die and the take-off position when the boundary conditions are fixed velocity ate the die exit and a fixed velocity at the take-off position. Draw resonance occurs for extensional thinning polymer melts when draw ratio exceeds the polymer specific critical value take-off speed. Draw resonance is melt flow instability under extensional flow condition that is manifested as irregularities in the final film or fiber dimensions. Further draw down above the critical causes melt breakage.

Extensional thinning polymers show draw resonance at their critical draw down ratio.

Polymers substantially linear or short chain branched show extensional thinning behaviour. Some common examples are linear low density polyethylene, high density polyethylene, polypropylene homo and co-polymers, thermoplastic polyurethanes, polyether-ester copolymers, linear polyamides, polyamide-ether copolymers or polylactic acid polymers.

Critical draw-down ratios for common commercial extensional thinning polymers are situated between 20 and 40.

Gross Melt Fracture

Under extensional flow condition, extensional thickening and Troutonian polymer melts show sudden gross melt fracture at their critical draw down ratio. Gross melt fracture occurs at a specific critical draw down ratio for each polymer and strongly depends on local stress, flaws distribution, crack size and crack growth. In molten highly entangled polymers, the force attracting and individual molecule to its neighbours is very large because of the enormous length of the molecules. In addition, when deformed, polymer molecules are oriented and often stretched depending of the deformation field. The induced anisotropy gives large differences in normal stresses and then material inhomogeneities dependent of this stress differences.

Polymers having structure substantially long branched chains tend to show an extensional thickening behaviour. Examples can be low density polyethylene and its co-polymers like ethylene vinyl acetate or acrylate or polystyrene; polyolefin elastomers and plastomers; high melt strength polypropylene; partially cross-linked with peroxides linear low density polyethylene; ionomers; acrylic or methacrylic acid copolymers; or chain extended branched polyesters, polylactic acid polymers and polyamides.

Polymers showing extensional thickening behaviour under extensional flow conditions usually have a critical draw down ratio between 30 and 80.

The role of flaws or material inhomogeneities as nucleation sites for cavities and cracks are essential for the fracture mechanics. Chen et al, "shear fracture of polystyrene melts and solutions-Rheol. Acta 1994" studied the possible role of nucleation sites in melt rupture supporting the hypothesis that the growth of a cavity is essential for rupture. They also observed that the addition of solvent reduce the critical stress for fracture. They conclude that flaw size is an intrinsic property of a polymer melt or solution at a given temperature. An intrinsic flaw size has also been remarked by Kinlock and Young "Fracture behaviour of polymers-New York Elsevier 1983" to explain the failure of rubbers and glassy polymers.

U.S. Pat. No. 5,688,457 explains the boron nitride effect in the extrusion of fluoropolymers and polyolefins. Boron nitride particles provide many nucleation sites for many very small cracks, thus relieving the stresses that cause large scale rupture before reaching the critical value.

Is a common conclusion that gross melt fracture occurs at a specific critical draw down ratio for each polymer and strongly depends on local stress, flaws distribution, crack size and crack growth.

The most accurate development to predict the polymer melts extensional behaviour has been developed only for Ethylene polymers by Dow Chemical trough the DRI (Dow rheological index) presented at Antec 1993 proceedings. DRI is independent of shear viscosity and must be calculated for each particular polymer through non-linear regression of experimental data using the general equation:

$$DRI = \left(3.65*10^6*\frac{\tau_0}{\eta_0} - 1\right)\bigg/10$$

Where:
$\tau_0$=Characteristic relaxation time.
$\eta_0$=Zero shear viscosity

The index ranges from 0 (polymers with no long chain branching) to 30.

In spite of all these developments, the extensional behaviour of a polymer melt cannot be predicted for a particular polymer and still must be measured with an elongational rheometer (RME rheometrics) or by a Gottfert Rheotens, which is a common apparatus available in the art for a skilled person in the extrusion field.

The draw-down instability is also affecting productivity in extrusion-coating processes where the substrate is covering the required mechanical performance of the product, in this case, high speed and low coating weight is needed. The extremely narrow die gaps needed to obtain the targeted low coating weights substantially increase the polymer shear stress obliging to work the extrusion line at low speed unless it is able to work at higher draw down ratios.

Significant developments either in process, equipment or melt compositions have been disclosed with the aim to improve resonance critical draw-down ratios for linear polymers, either by mechanical devices at the extrusion equipment see, for example, U.S. Pat. No. 4,668,463, 4,608,221 or 4,626,574; over-heating or rapid melt cooling in U.S. Pat. Nos. 4,859,379 and 4,486,377; edge encapsulation of linear low density polyethylene by low density polyethylene in U.S. Pat. No. 4,348,346 or full width encapsulation in "Tension in multilayer film casting of polymer melts" Baigui B. 1998; Polymer degradation in U.S. Pat. Nos. 3,247,290 and 4,378,451; melt blends of linear low density polyethylene with low density polyethylene, U.S. Pat. Nos. 4,339,507, 5,582,923, 4,780,264, 5,773,155, 5,674,342, 4,339,507, 5,395,471, 7,846,551, 33,836,694A and 5,863,665.

J. Z Liang in "*Melt elongation strength and drawability of LDPE/LLDPE blends*", Institute of plastics machinery and plastics engineering, Beijing University of chemical technology, teaches improvements in the melt drawability for 60% LDPE content in molten blends of LLDPE and LDPE.

Joo Sung Lee in "*Stabilization of film casting by an encapsulation method*", Department of Chemical and Biological Engineering, Applied rheology center, Korea University, February 2003, teaches some draw down and neck-in improvements by encapsulating the edges of a melt of HDPE by LDPE in a film extrusion-coating machine.

Although, there is prior art teaching an improvement in critical draw down ratios compared with the critical draw down ratio of individual behaviour of the components, there is still the need to provide a practical method capable of substantially improve the critical draw down ratio in multilayer structures compared with the critical draw down ratio of individual behaviour of the polymers forming the layers of the extruded multilayer, whose method be suitable for many polymers in an easy, safe and reproducible way.

SUMMARY OF THE INVENTION

The present invention was made in view of the prior art described above, and the object of the present invention is to provide a co-extruded multilayer structure having an improved critical draw-down ratio compared with the critical draw-down ratio of each one of the layer's polymers present in the multilayer, individually extruded. Therefore, the present invention provides a co-extruded multilayer structure that under extensional flow condition is capable of higher elongation or extension without elongation flow instabilities emerge.

To solve the problem posed by the invention, in a first aspect, the present invention provides a co-extruded multilayer structure, the structure comprising a first composite layer disposed over a second composite layer, and further comprising an inter-layer disposed between the first and the second composite layer, wherein the first composite layer contains a first polymer, the second composite layer contains a second polymer, and the inter-layer chemically or physically interacts with the first polymer and the second polymer, adhering both layers either in molten and after polymers solidification.

wherein the first polymer and the second polymer differ from each other in at least its extensional viscosity, one polymer maintaining or increasing its extensional viscosity at its critical draw down ratio under tensile stress, and the other polymer decreasing its extensional viscosity at its critical draw down ratio under tensile stress, and wherein the inter-layer is obtainable by a co-extrusion method that uses one common die, the method comprising the following steps:

feeding the first and the second composite layers to the one common die under temperature in order to co-extrude the molten layers simultaneously, the inter-layer being formed by chemically interaction between the first and the second polymer, or optionally the inter-layer being formed by physically interaction between the first and the second polymer if a third adhesive layer is simultaneously fed between the first and the second composite layers to the one common die, after the co-extruded layers leave the die, stretching the molten co-extruded layers under tensile stress, whereby the resulted coextruded multilayer structure has a draw-down ratio which is higher than the critical draw-down ratio of each one of the first and of the second polymers, individually extruded, thereby decreasing the cross-sectional area of the co-extruded multilayer structure to a lower value, cooling down the co-extruded multi-layer structure to room temperature, and optionally, stretching and cooling steps are performed isolating the co-extruded multilayer structure from ambient air.

According to the present invention, the co-extruded multilayer structure can have a flat, tubular or profile shape depending on if a flat die, a tubular die or a selected profile die is used as one common die in a conventional extrusion technique.

That is, the present inventors found that the selection of a first and of a second polymers with different extensional viscosity behavior, subject to the proviso that at their individual critical draw down ratios one polymer decreases its extensional viscosity and the other polymer increases its extensional viscosity, results in a molten co-extruded multilayer structure with a higher extension/elongation value under tensile stress.

In an embodiment, the first and/or the second polymer can be independently a polymer blend.

According to the present invention, the first and/or the second polymer blend has the same behavior as the first and/or the second polymer, respectively.

Therefore, it is within the scope of the present invention to replace the first polymer for a first polymer blend and/or to replace the second polymer for a second polymer blend with the proviso that the polymer blend has the behavior of the correspondent replaced first and/or the second polymer.

In a preferable embodiment, the resulted coextruded multilayer structure has a critical draw-down ratio of 10%, 20%, 50%, 90%, 100% 150%, 200%, 250%, 275% or 300% superior to the critical draw-down ratio of each one of the first and of the second polymers, extruded individually.

The fact that the resulted coextruded multilayer structure has an improved critical draw-down ratio is based on a different behaviour of the selected layers present in the coextruded multilayer structure thus formed. In this behaviour, the extensional thinning layer is supported by the extensional thickening layer at its resonance critical drawn-down ratio by means of its melt strength and, the extensional thickening layer is supported by the extensional thinning layer at its critical draw-down ratio due to the fact that the small cracks forming at the beginning of the melt rupture do not grow because of the support of the extensional thinning layer resulting in relaxing the extensional thickening layer tensions instead of producing the rupture propagation across the layer and the full breakage of this melt. As consequence, the critical draw-down for gross melt fracture is substantially improved by the presence of the extensional thinning layer in the set of selected behaviour of layers.

Advantageously, the first aspect of the present invention provides a co-extruded multilayer structure with lower thicknesses or lower diameters as well as lower weights, which makes the co-extruded multilayer structure suitable as a thinner coating and, therefore, of lower weight.

Polymers decreasing its extensional viscosity at their critical draw down ratio under tensile stress are polymers those structure is substantially linear or contains short branched chain that when they are subjected to tensile stress their molecule chains became more or less oriented in the shear direction, thereafter the molecule chain disentangle to a certain extent, which lower their flow resistance.

Extensional thinning behaviour polymers can be selected without to be a limited list from: Linear low density polyethylene; polyethylene and polybutylene terephthalate; Polyether-ester block copolymers; Polyether-amide block co-polymers; thermoplastic polyurethanes; polypropylene homo and co-polymers; High density polyethylene; medium density polyethylene linear polyamides; polylactic acid polymers, and their co-polymers or blends and their blends with mineral fillers.

Polymers increasing its extensional viscosity at their critical draw down ratio under tensile stress are polymers those structure is substantially long branched chain that when they are subjected to tensile stress their molecule chains tangle and therefore prevent relative motion between the molecule chains, which higher their flow resistance.

Troutonian polymer melts show sudden gross melt fracture at its critical draw down ratio under tensile stress, so in the present invention a Troutonian polymer can used as an extensional thickening polymer.

Extensional thickening behaviour polymers or Troutonian polymers can be selected without to be a limited list from: Low density polyethylene; Ethylene vinyl acetate and acrylate copolymers; polystyrene; polyolefin plastomers and elastomers; high melt strength polypropylene; cross-linked polypropylene with peroxide or zinc catalyser (like dymalink 9200 from Cray Valley); partially cross-linked linear low density polyethylene and its co-polymers; polyolefinacid co-polymer; ionomers; branched polyamides, polylactic acid polymers and polyesters with chain extenders; and their co-polymers or blends and their blends with mineral fillers.

Preferable first polymer and/or second polymer is selected to have a water vapor transmission rate equal or higher than 1 g mm/m² day.

In one embodiment, the co-extruded multi-layer structure is a film with a thickness as low as 1 µm.

In a different embodiment, the co-extruded multi-layer structure is a filament with a diameter as low as 1 µm.

In an embodiment, the co-extruded multi-layer structure has a water vapor transmission rate ranging from 1,000-20,000 g/m² day.

The co-extruded multilayer structure obtainable by the method described herein allows preparing films, filaments or spun-melt non-wovens of low weight at high speed using conventional extrusion equipment.

The co-extrusion method described herein can be selected from any one of the followings: cast extrusion, blown film extrusion, extrusion-coating, extrusion-lamination, curtain coating extrusion, profile extrusion, filament spinning or spun-melt nonwoven extrusion.

In a second aspect, the present invention provides a method capable of obtaining the co-extruded multilayer structure of the first aspect of the invention.

Thus, in a second aspect the present invention provides a method for obtaining a co-extruded multi-layer structure, the structure comprising a first composite layer disposed over a second composite layer, and further comprising an inter-layer disposed between the first and the second composite layer by using a conventional co-extrusion technique with one common die, the method comprising the steps of:
  selecting a first polymer and a second polymer, with the proviso that the first polymer and the second polymer differ from each other in at least its extensional viscosity, one polymer increasing its extensional viscosity at its critical draw down ratio under tensile stress, and the other polymer decreasing its extensional viscosity at its critical draw down ratio under tensile stress, the extensional viscosity being defined as the ratio between extensional stress and extensional rate in a conventional extrusion techniques,
  feeding the first and the second composite layers to the one common die under temperature in order to co-extrude the molten layers simultaneously, the inter-layer being formed by chemically interaction between the first and the second polymer, or optionally the inter-layer being formed by physically interaction between the first and the second polymer if a third adhesive layer is simultaneously fed between the first and the second composite layers to the one common die,
  after the co-extruded layers leave the die, stretching the molten co-extruded layers under tensile stress, whereby the resulted coextruded multilayer structure has a draw-down ratio which is higher than the critical draw-down ratio of each one of the first and of the second polymers, individually extruded, thereby decreasing the cross-sectional area of the co-extruded multilayer structure to a lower value,
  cooling down the co-extruded multi-layer structure to room temperature, and
  optionally, stretching and cooling steps are performed isolating the coextruded multilayer structure from ambient air.

Advantageously, the method defined in the second aspect of the present invention saves costs in raw materials, saves weight both in handling raw materials which can be of lower size as well as in the finished materials usually rolled, and moreover produce less waste materials due to the fact that in more or less degree extensional flow instabilities are prevented so less amount of rejected extrudate polymers are generated.

The critical draw-down ratio of the molten co-extruded layers can be defined as the maximum extension/elongation value under tensile stress without elongation flow instabilities emerge.

In a third aspect, the invention provides a co-extruded multilayer structure as defined in the first and/or the second aspects of the invention for use as a coating on a substrate, wherein the substrate can be selected from the group consisting of a polymer, paper, textile material, non-woven material or metal film, and wherein the substrate is coated with the coextruded multilayer structure by using a conventional extrusion method selected from extrusion-coating, curtain-coating extrusion, extrusion-lamination, cast extrusion, blown film extrusion, profile extrusion, filament spinning and spun-melt nonwoven extrusion.

The present invention is also directed to a diaper backsheet comprising the co-extruded multi-layer structure.

Packaging coatings comprising the co-extruded multi-layer structure defined in the present invention such as non-woven bags or carton bricks are also contemplated herein.

The method described herein for obtaining the co-extruded multilayer structure is especially suitable for the production of 1 to 14 microns in thickness for low weight films, filaments and spun-melt nonwovens. Therefore, the obtained polymeric coating of 1 to 14 microns in thickness or diameter is suitable for using as a coating on substrates selected from cellulose, polymer films, nonwovens, metals or textiles.

DETAILED DESCRIPTION OF THE INVENTION

Figure 1:
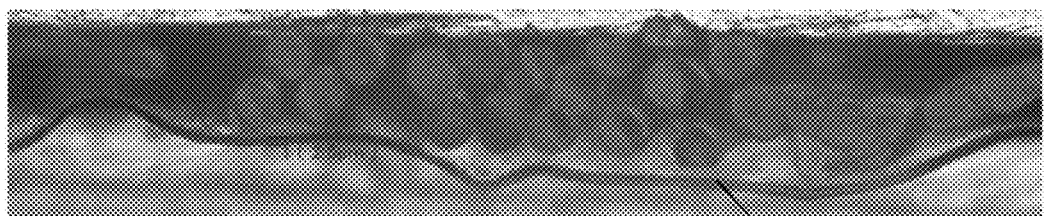
FIG. 1 shows a cross section of the co-extruded multilayer structure obtained according to example 1 of the invention having a total thickness of 2.5 µm and coated on a spun-melt polypropylene non-woven substrate of 15 g/m².

A good adhesion of the interlayer with the first and second composite layers results when the interlayer is bonded to the first and the second composite layers both in molten state and thereafter when the multilayer structure has been solidified. Interlayer adhesion strength should be, at least, at the level of melt strength of the strongest layer; insufficient adhesion level could only give moderate improvements in draw-down and quickly produces interfacial instabilities by partial or total layer delamination caused by a significant difference in rheological behaviour between layers.

The interlayer can be obtained by three different ways:
The interlayer can be formed by chemically interaction between the first and the second polymers. In this embodiment, first and second polymers are selected to be compatible polymers between them, that is, polymers that in molten state and thereafter when the multilayer structure has been solidified form together a continuous phase. Under extrusion temperatures, both the first and the second polymers form a blend matrix, thereby the interlayer being formed during the extrusion method, particularly when they contact under temperature at the one common die.

The interlayer can be formed by chemically interaction between the first and the second polymers, provided that the first composite layer and/or the second composite layer further contain a dispersed adhesive material therein. Under extrusion temperatures, the adhesive material blends with the first polymer and/or with the second polymer. The adhesive material dispersed in the first composite layer and/or in the second composite layer improves the compatibility between the first and the second polymers. Depending on the compatibility degree between the first and the second polymers, the adhesive material can be added in an amount ranging from 0.5-10% by weight of the total weigh of the polymer when the first and the second polymers have a tendency to homogeneously blend together when contact in a molten state, or either in an amount ranging from 10-60% by weight of the total weigh of the polymer when the first and the second polymers do not homogeneously blend together when contact in a molten state.

The interlayer can be formed by physically interaction between the first and the second polymer. In this embodiment, a further layer, which is an adhesive layer, is simultaneously fed between the first and the second composite layers to the one common die. The adhesive layer can be a tie layer which is made of an adhesive material. With dissimilar non-compatible polymers, it is preferable to use this additional tie layer. The tie layer should be selected to have strong adhesion properties to both composite layers.

Preferable adhesive layer is a tie layer which is made of an adhesive material.

In one embodiment, a co-extruded multilayer film is extruded using an extrusion-coating, curtain coating or extrusion laminating equipment onto a substrate. It is preferable cool down the co-extruded multilayer film to room temperature before contacting the substrate in order to avoid excessive consumption of polymer in fulfilling the substrate roughness.

The co-extruded multilayer film comprises two layers, one of an extensional thinning behaviour polymer, optionally containing an adhesive material dispersed therein, and another of an extensional thickening behaviour polymer, optionally containing an adhesive material dispersed therein. Preferably, the same adhesive material can be also used for bonding the co-extruded multilayer film onto the substrate, thereby avoiding the usage of a second adhesive material for bonding the coating with the substrate.

In a different embodiment, the co-extruded multilayer film comprises three layers, one of an extensional thinning behaviour polymer, another of an extensional thickening behaviour polymer, and the third layer of an adhesive material. Preferably, the same adhesive material can be also used for bonding the co-extruded multilayer film onto the substrate, thereby avoiding the usage of a second adhesive material as a layer for bonding the coating with the substrate.

In an embodiment, the combination of polymers and layers can results in a critical draw down ratio of 260 in the extrusion process, thereby allowing a film total thickness below 3 µm at equipment take-off speed of more than 500 m/min.

Coating thickness of coated samples cross-sections can be measured with optical microscope equipped with lens scale.

It is preferable that the extensional thickening layer do not be situated in a position between the adhesive layer and the equipment rolls to prevent direct contact of the adhesive layer with this roll that may cause wrapping around it and equipment stops.

Figure 3:
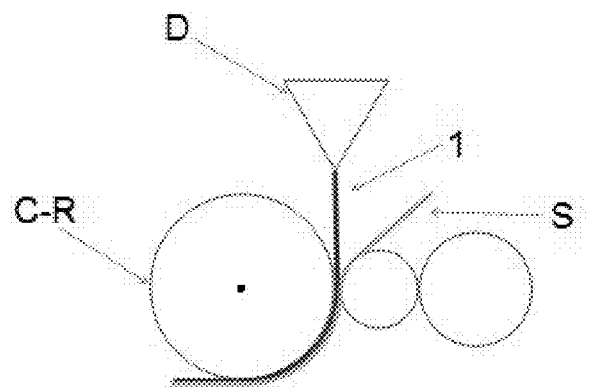
FIG. 3 depicts a schematic view of a conventional extrusion-coating equipment. In this embodiment, a conventional extrusion-coating equipment is provided with a common die (D) from which leaves the co-extruded multilayer structure (1), then stretched and cooled within the air gap (A), and thereafter used as a coating of a substrate(S), then the coated substrate is rolled in a cooling roller (C-R).
Figure 4:
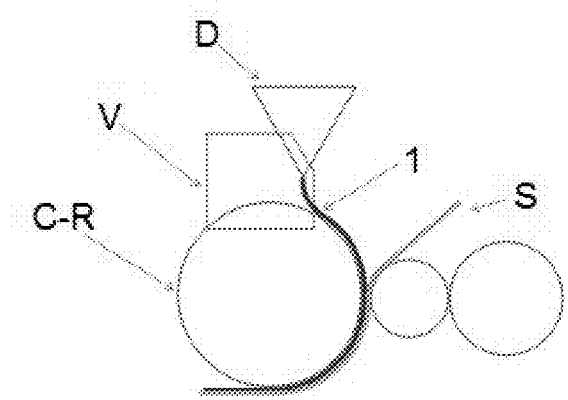
FIG. 4 depicts a schematic view of the conventional extrusion-coating equipment shown in FIG. 3, further provided with a vacuum box (V). The vacuum box (V) isolates the molten co-extruded multilayer structure (1) from the ambient air for stability purposes. In this embodiment, the molten co-extruded multilayer structure (1) is cooled in contact with a cooling roller (C-R). Thereafter, the co-extruded multilayer structure (1) is used as a coating of a substrate(S), then the coated substrate is rolled in a cooling roller (C-R).

In an embodiment, curtain coating method is employed for coating a substrate(S) with and simultaneously as the co-extruded multilayer structure (1) is formed (FIG. 3). When the melt curtain thickness is lower than 2 µm it becomes to be disturbed by the air flows generated around the cooling roll (C-R). In order to improve the melt curtain stability, a vacuum box (V) can be used to support the melt curtain onto the cooling roll (C-R) surface (FIG. 4).

Preferable compositions for preparing the co-extruded multilayer structure can be:
Composition 1)
    Base polymer Polyethylene:
    Extensional thinning layer: linear low density polyethylene MFI preferably from 2 to 30; layer thickness from 0.5 to 6 µm.
    Extensional thickening layer: low density polyethylene MFI 2 to 30 blended with a hydrocarbon Tackifier, which is fully compatible with the blended polymer. The hydrocarbon tackifier is preferably selected from the group of an average molecular weight from 600 to 3,000 in an amount of 15% to 60% by weight, preferably from 20 to 40% by weight of the total weight of the extensional thickening layer; layer thickness from 0.1 to 6 µm.

Composition 2)

Base polymer Polypropylene:

Extensional thinning layer: PP homo-polymer or co-polymer MFI 2 to 30; layer thickness from 0.5 to 6 µm.

Extensional thickening layer: long branched High melt strength polypropylene or in situ long branched polypropylene via crosslinking, MFI 2 to 30; blended with a hydrocarbon tackifier, which is fully compatible with the base polymer. The hydrocarbon tackifier is preferably selected from the group of an average molecular weight from 1,000 to 3,000 in a proportion of 15% to 60% by weight, preferably from 20% to 40% by weight of the total weight of the extensional thickening layer; thickness from 0.1 to 6 µm.

This second composition is especially suitable for coated substrates for the production of non-breathable diaper back-sheets when the substrate is a non-woven or complex packaging coatings. Substrate can be a cellulose paper, a metal layer, especially aluminium, or a polymeric layer, and packaging material for bags when the substrate is a textile and especially woven raffia.

Preferable compositions for preparing a water vapour breathable coated polypropylene non-woven extruding a co-extruded multilayer film in extrusion-coating, curtain coating or extrusion-laminating equipment onto a polypropylene non-woven substrate can be:

an extensional thinning layer, optionally containing an adhesive material dispersed therein, selected from a group having values of water vapour permeability measured with ASTM E96B method higher than 1 g mm/m² day and based on mechanisms of absorption-desorption (no porosity), for example, but not exclusively: Polyether-ester block co-polymer elastomer (commercially known as Hytrel from Dupont or Arnitel from DSM); styrene block co-polymers; polyamides 6 or 6.6; Polyethylene and Polybutylene terephthalate; Polyethylene oxide block-copolymers; ABS; thermoplastic polyurethanes; polyether block amides (like Pebax from Arkema); bio-polymers like PLA; acrylic-co-polymers; or its blends or co-polymers. Layer thickness 0.5 to 6 µm.

And,

An extensional thickening layer, optionally containing an adhesive material dispersed therein, selected from the group of:

Low density polyethylene methyl or ethyl acrylate co-polymers or same co-polymers anhydride or acid modified. Layer thickness 0.1 to 2 µm.

An acrylic or methacrylic acid co-polymer of a Polyolefin. Layer thickness 0.1 to 2 µm.

An ionomer. Layer thickness 0.1 to 2 µm.

Ethylene vinyl-acetate co-polymer with more than 18% vinyl-acetate content blended with a compatible tackifier in a mass proportion of 20-60% by weight of tackifier. Layer thickness 0.1 to 2 µm.

This combination of polymers and layers can reach critical drawdown ratios higher than 150 and Mocon ASTM 1249 water vapour breathability between 3.000 and 20.000 g/m² day.

In another embodiment, polyolefin filaments are extruded in a bi-component core-sheath filament extrusion equipment or spun-melt nonwoven equipment with the following compositions:

Composition 3)

Filament core: 10% to 90% by weight of the total filament section.

Extensional thickening polyolefin (High Melt Strength Polypropylene or Low density Polyethylene) 40% to 90% by weight; MFI from 2 to 30; hydrocarbon compatible tackifier preferably with an average molecular weight between 1,000 and 3,000, 10% to 60% by weight.

Filament sheath: 10% to 90% by weight of the total filament section.

Extensional thinning polyolefin Polypropylene homo-polymer or co-polymer, or linear low density polyethylene MFI from 2 to 30.

A similar embodiment is performed by using a simple filament extrusion (instead the bi-component one) and a higher viscosity polymer at lower volume percent in the core than the polymer viscosity and volume percent in the sheath.

Composition 4)

Filament composition:

Extensional thickening polyolefin, High melt strength polypropylene or Low density polyethylene, MFI from 2 to 10; 10% to 30% of the total weight;

Extensional thinning polyolefin, Polypropylene homo or co-polymer or Linear low density polyethylene, MFI 10 to 30; 60% to 85% of the total weight; compatible Tackifier from 5% to 10% by weight.

With this composition, in single component extrusion equipment, the minor volume percent and higher viscosity component goes to the core and the major volume percent and lower viscosity component goes to the sheath self-structuring the core-sheath filament.

In another embodiment, three layers were extruded simultaneously to obtain a blown co-extruded multilayer film with improved bubble stability at high draw-down.

In this embodiment, the layer composition comprises:

an inner layer composed of: extensional thickening layer as mentioned above like low density polyethylene or high melt strength polypropylene or in-situ branched linear polymers via cross-linking 90% to 50% blended with a hydrocarbon tackifier 10% to 50%; and an outer layer composed of: extensional thinning layer as mentioned above like linear low density polyethylene, polypropylene homo or co-polymers.

EXAMPLES

Example 1: See Cross Section in FIG. 1

Product: Non breathable back-sheet for diapers.
Equipment: Extrusion coating machine 1.5 m width.
Substrate: Polypropylene homo-polymer spun-bond non-woven 15 g/m².
layer structure: A-B-substrate
A-layer composition: Extensional thinning polymer linear low density polyethylene Dowlex 2552E MFI 25.
B-layer (tie layer) composition: 75% by weight Extensional thickening polymer Low density polyethylene Dow LDPE PG7008 MFI 7, 7; Hydrocarbon tackifier molecular weight 1200 Eastman Regalite R1125, 25% by weight.
Process settings at stable running:
Extrusion temperature both layers 220° C.
Die gap (hot) 0.4 mm Output speed 400 m/min
Air Gap: 345 mm
Total Coating thickness: (FIG. 1) 2.5 μm
A-Layer thickness: 1.5 μm.
B-layer thickness: 1 μm
Draw-Down: 160

Figure 2:
FIG. 2 shows a cross section of the co-extruded multilayer structure obtained according to example 2 of the invention having a total thickness of 1.5 µm and coated on a spun-melt polypropylene non-woven substrate of 15 g/m².

Example 2: See Cross Section in FIG. 2. Same Product and Composition than Example 1 but Using a Vacuum Box and Cooling on Cast Roll Surface (FIG. 4)

Output speed: 550 m/min
Total Coating thickness (FIG. 2) 1.5 μm
A-layer thickness: 0.9 μm
B-layer thickness: 0.6 μm
Draw down: 266.

Example 3

Product: Breathable back-sheet for diapers.
Same equipment example 1.
Substrate: Polypropylene homo-polymer spun-bond non-woven 15 g/m².
Layer structure: A-B-substrate.
A-layer composition: Extensional thinning polymer, Polyether-Ester block co-polymer Dupont Hytrel DYM350 NC010 MFI 15.
B-layer-Tie layer composition: Extensional thickening polymer Low density Polyethylene-Ethylene acrylate co-polymer resin Dupont Bynel 22E804
Process settings at stable running.
Extrusion temperature both layers: 270° C.
Die gap (hot) 0.4 mm.
Vacuum box (cooling on cast roll).
Total Coating thickness 3 μm.
A-layer thickness: 2 μm
B-layer thickness: 1 μm
Line speed: 550 m/min.
Draw down: 133.
Breathability (Mocon test ASTM1249): 5,200 g/m² day Example 4

Product: Breathable back-sheet for diapers.
Same equipment example 1.
Substrate: Polypropylene homo-polymer spun-bond non-woven 15 g/m².
Layer structure: A-B-substrate.
A-layer composition: Extensional thinning polymer, Polyamide 6 Zytel ST7301 NC010.
B-layer-Tie layer composition: Extensional thickening polymer Low density Polyethylene-Anhydride modified Ethylene acrylate co-polymer resin Dupont Bynel 21E830.
Process settings at stable running.
Extrusion temperature both layers: 265° C.
Die gap (hot) 0.4 mm.
Vacuum box (cooling on cast roll).
Total Coating thickness 2.5 μm.
A-layer thickness: 1.5 μm
B-layer thickness: 1 μm
Line speed: 550 m/min.
Draw down: 160.
Breathability (Mocon test ASTM1249): 4,200 g/m² day Example 5

Product: PP Coated raffia for bags.
Same equipment as example 1.
Substrate: woven PP raffia 220 g/m2.
Structure: A-B-Substrate
A-Layer composition: Extensional thinning polymer, polypropylene Homo-polymer Repsol Isplen PP086Y3E MFI 25.
B-Layer composition: 89.5% by weight Extensional thickening polymer Repsol Isplen PP086Y3E MFI 25; crosslinked with 0.5% by weight of Cray valley Dymalink 9200 and 10% by weight Eastman tackifier Regalite R1125.
Process settings at stable running:
Extrusion temperature both layers: 260° C.
Die gap (hot) 0.4 mm.
Air Gap 400 mm.
Total Coating thickness 3 μm.
A-layer thickness: 2 μm
B-layer thickness: 1 μm
Line speed: 550 m/min.
Draw down: 133.

Example 6

Product: PP spun-bond non-woven
Equipment: Reicofil bi-component spun-bond machine.
Layer structure: core/sheath filament A/B
Core layer A: 90% by weight High Melt Strength Polypropylene Daploy WS420 HMS MFI 22+10% by weight Eastman tackifier Plastolyn R1140.
Sheath layer B: Polypropylene Homo-polymer Repsol Isplen PP086Y3E MFI 25.
Process settings at stable running:
Extrusion temperature: 260° C.
Spinneret capillary diameter sheath: 0.6 mm
Spinneret capillary diameter core: 0.3 mm
Line speed 300 m/min
Resulting filament denier: 0.35
Draw down ratio: 105

The invention claimed is:
1. A method for producing a co-extruded polymeric multilayer comprising:
  i. selecting a first composite layer containing a first polymer, and a second composite layer containing a second polymer, the first composite layer being disposed over the second composite layer,
     wherein the first composite layer has an extensional viscosity that is increasing at a critical drawdown ratio of the first composite layer, and
     wherein the second composite layer has an extensional viscosity that is decreasing at a critical drawdown ratio of the second composite layer,
     wherein the first composite layer extensional viscosity and the second composite layer extensional viscosity is measured by an elongational rheometer RME as a function of varying strain rate,
  ii. co-extruding the first composite layer and the second composite layer at the same time in one common die under temperature, to obtain a co-extruded polymeric multilayer melt, and
  iii. stretching the co-extruded polymeric multilayer in melt condition to provide a drawdown ratio of at least 100, measured as the extensional viscosity ($\lambda$), wherein the drawdown ratio is the ratio of a cross-sectional area of the co-extruded multilayer melt to a cross-sectional area of the final co-extruded polymeric multilayer, and wherein the extensional viscosity ($\lambda$) is represented by the formula:
  $\lambda = \sigma/(d\varepsilon/dt)$, where

σ is the extensional stress and
ε is the extension strain,
and
wherein the final co-extruded polymeric multilayer has a thickness of 1 to 14 μm, and
wherein the co-extruded polymeric multilayer has an improved critical draw down ratio compared to the critical drawdown ratio of the first composite layer and the critical drawdown ratio of the second composite layer.

2. The method of claim 1, wherein the critical draw down ratio of the co-extruded polymeric multilayer is at least 10% greater than of the critical draw down ratio of the first composite layer and the critical drawdown ratio of the second composite layer when extruded separately.

3. The method of claim 1, wherein a third adhesive layer is simultaneously fed between the first and the second composite layers and wherein the co-extruding is carried out by feeding the first composite layer, the second composite layer and the third adhesive layer between the first and the second composite layers at the same time in one common die under temperature, to obtain the co-extruded polymeric multilayer melt, and wherein the third adhesive layer is a tie layer.

4. The method of claim 1, wherein the first composite layer and/or the second composite layer further comprises an adhesive material dispersed in the first polymer and/or in the second polymer, and wherein the adhesive material is dispersed in a concentration ranging from 0.5-60% by weight of the polymer of each composite layer.

5. The method of claim 1, wherein the first polymer and/or the second polymer have a water vapor transmission rate equal to or higher than 1 g mm/m$^2$ day as measured according to ASTM E96B.

6. The method of claim 1, wherein the co-extruding is carried out by an extrusion technique selected from the group of extrusion-coating, extrusion-lamination or curtain coating extrusion.

7. The method of claim 1, wherein the co-extruded polymeric multilayer has a thickness in the range of 1 μm to 3 μm.

* * * * *